O. BENDER.
PROCESS OF MAKING SULFURIC ACID.
APPLICATION FILED MAR. 24, 1908.

900,688.

Patented Oct. 6, 1908.

Inventor:—
Oscar Bender

UNITED STATES PATENT OFFICE.

OSCAR BENDER, OF NEU-BABELSBERG, NEAR BERLIN, GERMANY.

PROCESS OF MAKING SULFURIC ACID.

No. 900,688.  Specification of Letters Patent.  Patented Oct. 6, 1908.

Original application filed April 15, 1907, Serial No. 368,343. Divided and this application filed March 24, 1908. Serial No. 422,884.

*To all whom it may concern:*

Be it known that I, OSCAR BENDER, engineer, of 12 Berlinerstrasse, Neu-Babelsberg, near Berlin, Kingdom of Prussia, Germany, have invented new and useful Improvements in Processes of Making Sulfuric Acid, of which the following is a specification.

The present invention refers to a process for making compounds of oxygen and sulfur (sulfuric acid, sulfuric anhydrid) directly from the elements at a high temperature and is a division of my application filed April 15, 1907, Serial No. 368,343.

The process consists in the oxygen or oxygen bearing gases being heated with sulfur or dioxid of sulfur by a furnace to a high temperature, whereupon the hot gas-mixture is still further heated by an oxy-hydrogen flame. The oxy-hydrogen is suitably produced by superheated steam being blown into the hot space. The steam will dissociate at the high temperature and the oxy-hydrogen produced will mix with the heated gases. When this mixture begins to cool the hydrogen is united with the oxygen in an oxy-hydrogen flame, which still further heats the reaction mixture and produces the uniting of the oxygen with the sulfur. The oxids thus produced are thereupon drawn off by a cooler current of steam, whereby the yield is more favorably influenced.

Figure 1:
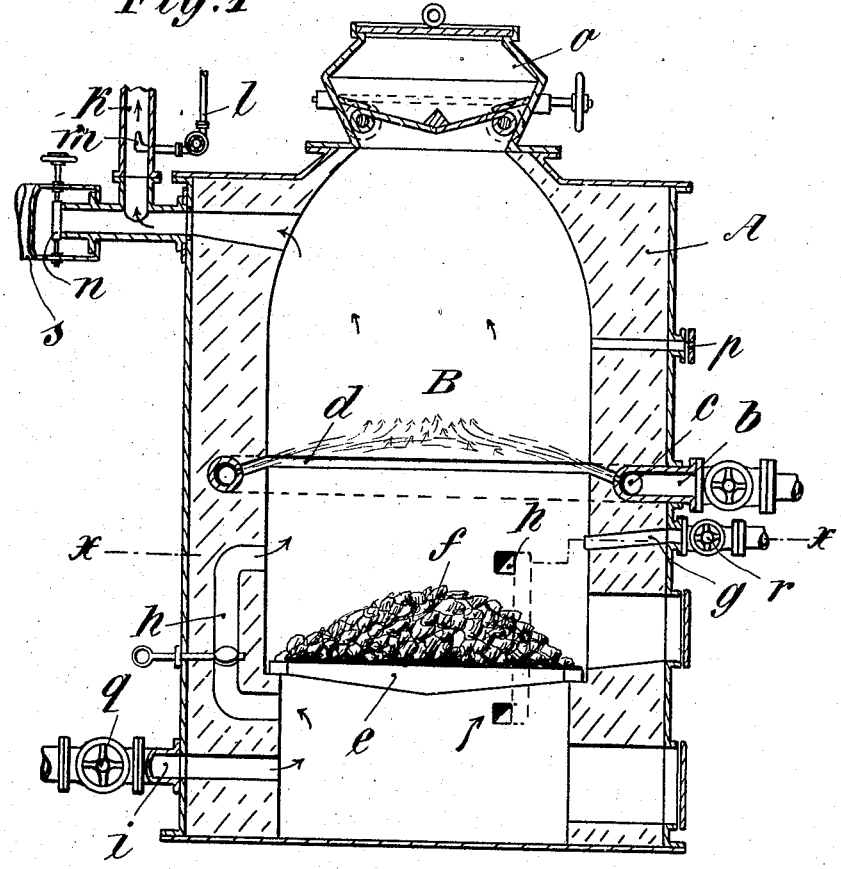
Figure 2:
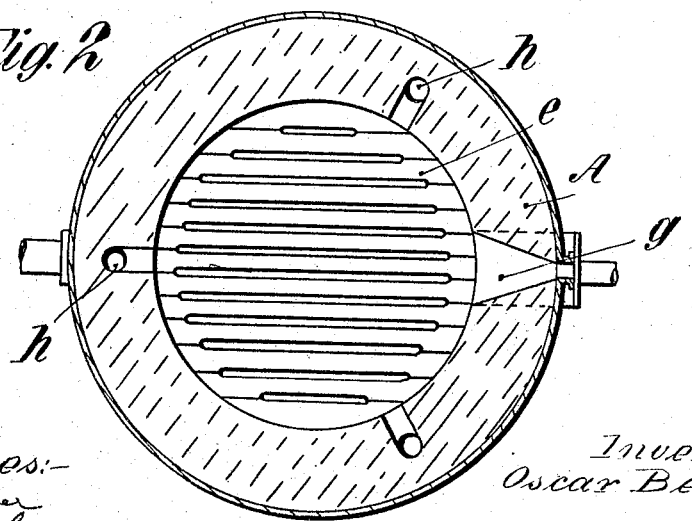

An arrangement, which might be employed for carrying out this process is shown in the accompanying drawing, in which Figure 1 is a longitudinal section, Fig. 2 a transverse section along X—X in Fig. 1.

The producer A made of fire-proof material and suitably well insulated has at its upper end a hopper $o$ for charging the fuel. In the lower part of the generator-shaft is arranged the grate $e$; $f$ is the fuel fire thereon. The tube $i$ arranged below the grate serves for the supply of atmospheric air, compressed air, oxygen and other substances required for the reaction. A second tube $g$ which may serve the same purpose is provided above the grates. Passages $h$ produce a communication between the space below the grate and the space above the fuel. These passages may also pass through the fuel. All tubes may be entirely or partly closable by means of valves, slides or the like $q, r$. Above the fuel where the temperature is highest an annular bent tube $c$ is fitted into the wall of the producer which communicates by an annular slot $d$ with the interior of the producer and by tube $b$ with a steam generating plant of any kind, so that it is possible to introduce high-pressure and superheated steam from all sides into the producer in a disk-like thin stream, and a point where the furnace produces under a strong draft the highest temperature, which can even be increased by supplying oxygen through tube $g$. The thus produced disk of steam which will fill out the whole section of the producer-shaft, is in a completely dissociated state, so that a little above this zone, where the gases have cooled down a little, say at B an oxy-hydrogen flame is produced, which will by its extreme heat still further heat the already heated substances mentioned above. A window $p$ allows of observing the reactions going on in the upper part of the producer.

For carrying off the products the tube $k$ is provided, which may communicate by a slide or the like $n$ with the passage C leading to the chimney. Into the exhaust-pipe $k$ is fitted a tube $l$ with a nozzle $m$, which serves to supply steam of a lower temperature, which flows in the direction of the escaping gases. This steam-jet produces a suction of the gas-mixture, a thorough mixing and at the same time by its lower temperature a cooling to such an extent, that the oxygen-compounds produced will not dissociate, after being thus mixed and cooled.

For carrying out the process, the producer is charged with a layer of coal and sulfur is supplied either below the grate or by mixing sulfur among the fuel, which will burn on the grate to dioxid of sulfur, or sulfurous oxid is introduced through tube $i$ or $g$. Oxygen or atmospheric air, which is suitably enriched with oxygen, is introduced in large quantities beneath the grate, say by means of a fan. On passing through the coal the air is deprived of the greater part of its oxygen, it is therefore advisable to replace such oxygen by introducing further quantities above the grate. By arranging fire-proof tubes or the like in the coal or by-passes, passages may however be created through which unchanged air may pass from below into the upper part of the producer. Owing to the great surplus of oxygen the combustion is perfect and in the space above the grate a highly heated gas-mixture of carbonic acid, oxygen and sulfurous acid is produced.

Into this mixture the partly dissociated steam escaping from tube c is introduced, containing still hydrogen and oxygen *in statu nascendi*. The producer may be lined in its upper portion with fire-bricks for producing a heat accumulator. The more above 1000° the temperature is, the better the steam is dissociated and the more nascent-oxygen is obtained. Somewhat above tube c an oxy-hydrogen flame is produced by the cooling of the gases, which flame will by its extreme heat still further heat the already highly heated gases. Into the escaping gas mixture a steam-jet of lower temperature is introduced through nozzle m. This nozzle produces a suction and at the same time by its low temperature a cooling and fixing of the sulfur-oxygen compounds produced.

When nitrogen is present, besides the oxids of sulfur also oxygen-compounds of nitrogen are produced, which have a favorable influence on the production of the sulfuric acid.

I claim—

1. A process of making sulfuric acid which consists in heating sulfur dioxid, oxygen and nitrogen first by the fire of a carbonaceous fuel and then by an oxy-hydrogen flame, whereupon the products of reaction are cooled at once and drawn off.

2. A process of making sulfuric acid which consists in heating sulfur dioxid, oxygen and nitrogen by the fire of a carbonaceous fuel and then by an oxy-hydrogen flame, the oxy-hydrogen being produced from steam superheated by the fire of the furnace blown into the heat space above the fuel, the products of reaction being finally cooled immediately and drawn off.

3. A process of making sulfuric acid consisting in heating sulfur dioxid, oxygen and nitrogen by the fire of a carbonaceous fuel and then by an oxy-hydrogen flame, the oxy-hydrogen being produced from steam blown into the heat space above the fuel and superheated thereby, the products of reaction being finally cooled immediately by a cooler steam current and drawn off.

4. A process of making sulfuric acid which consists in heating sulfur dioxid, oxygen and nitrogen by the fire of a carbonaceous fuel and then by an oxy-hydrogen flame, the oxy-hydrogen being produced by steam superheated by the fire of the furnace, said steam being blown into the heat space above the fuel, the products of the reaction being finally cooled immediately and drawn off by a cooler steam current flowing in the direction of the escaping gases.

5. A process of making sulfuric acid consisting of heating sulfur dioxid, formed by burning sulfur with oxygen and nitrogen by the fire of a carbonaceous fuel and then by an oxy-hydrogen flame, the products of reaction being finally cooled immediately and drawn off.

In testimony whereof I have hereunto set my hand in presence of two subscribing witnesses.

OSCAR BENDER.

Witnesses:
  HENRY HASPER,
  WOLDEMAR HAUPT.